(12) United States Patent
Quintero et al.

(10) Patent No.: US 8,210,263 B2
(45) Date of Patent: Jul. 3, 2012

(54) METHOD FOR CHANGING THE WETTABILITY OF ROCK FORMATIONS

(75) Inventors: Lirio Quintero, Houston, TX (US); David E. Clark, Humble, TX (US); Thomas A. Jones, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 160 days.

(21) Appl. No.: 12/490,783

(22) Filed: Jun. 24, 2009

(65) Prior Publication Data

US 2009/0325826 A1    Dec. 31, 2009

Related U.S. Application Data

(63) Continuation-in-part of application No. 12/146,647, filed on Jun. 26, 2008, and a continuation-in-part of application No. 11/866,486, filed on Oct. 3, 2007.

(60) Provisional application No. 61/076,022, filed on Jun. 26, 2008, provisional application No. 60/947,870, filed on Jul. 3, 2007.

(51) Int. Cl.
*E21B 37/00* (2006.01)

(52) U.S. Cl. .................................... 166/312; 166/305.1

(58) Field of Classification Search .................. None
See application file for complete search history.

(56) References Cited

U.S. PATENT DOCUMENTS

| | | | |
|---|---|---|---|
| 3,504,744 | A | 4/1970 | David, Jr. et al. |
| 3,983,940 | A | 10/1976 | Carpenter, Jr. et al. |
| 4,017,405 | A | 4/1977 | Holm |
| 4,125,156 | A | 11/1978 | Glinsmann |
| 5,830,831 | A | 11/1998 | Chan et al. |
| 6,581,687 | B2 | 6/2003 | Collins et al. |
| 6,593,279 | B2 | 7/2003 | VonKrosigk et al. |
| 6,613,720 | B1 | 9/2003 | Feraud et al. |
| 6,672,388 | B2 | 1/2004 | McGregor et al. |
| 6,989,354 | B2 | 1/2006 | Thaemlitz et al. |
| 7,134,496 | B2 | 11/2006 | Jones et al. |
| 7,238,647 | B2 | 7/2007 | Hayet et al. |
| 2002/0055438 | A1 | 5/2002 | Giard-Blanchard et al. |
| 2003/0166472 | A1 | 9/2003 | Pursley et al. |
| 2004/0063795 | A1* | 4/2004 | VonKrosigk et al. ............ 516/38 |
| 2005/0239664 | A1 | 10/2005 | Patel et al. |
| 2006/0073986 | A1 | 4/2006 | Jones et al. |
| 2006/0096757 | A1 | 5/2006 | Berry et al. |
| 2006/0211593 | A1 | 9/2006 | Smith et al. |
| 2006/0223715 | A1 | 10/2006 | Svoboda et al. |
| 2006/0258541 | A1 | 11/2006 | Crews |
| 2007/0295368 | A1 | 12/2007 | Harrison et al. |
| 2009/0183877 | A1 | 7/2009 | Quintero et al. |

FOREIGN PATENT DOCUMENTS

| | | | |
|---|---|---|---|
| WO | 0100747 | A1 | 1/2001 |
| WO | WO 2006/051255 | * | 5/2006 |
| WO | 2006109016 | A1 | 10/2006 |

OTHER PUBLICATIONS

M. Minana-Perez, et al., "Solubilization of Polar Oils with Extended Surfactants," Colloids and Surfaces A: Physicochemical and Engineering Aspects, 1995, pp. 217-224, vol. 100.

M. Minana-Perez, et al., "Solbilization of Polar Oils in Microemulsion Systems," Progr. Colloid Polym. Sci., 1995, pp. 177-179, vol. 98.

J. Salager, et al., "Chapter 8: Ionic Microemulsions," P.Kumar, et al. Handbook of Microemulsion Science and Technology, 1999, pp. 247-280, Marcel Dekker, New York.

S. Ezrahi, A. Aserin and N. Garti, "Chapter 7: Aggregation Behavior in One-Phase (Winsor IV) Microemulsion Systems", in P. Kumar and K. L. Mittal, ed., Handbook of Microemulsion Science and Technology, Marcel Dekker, Inc., New York, 1999, pp. 185-246.

J. L. Salager, et al., "Enhancing Solubilization in Microemulsions—State of the Art and Current Trends," Jrn'l of Surfactants and Detergents, Jan. 2005, pp. 3-21, vol. 8, No. 1.

G. Penny, et al., The Application of Microemulsion Additives in Drilling and Stimulation Results in Enhanced Gas Production, SPE 94274, 2005 SPE Production and Operations Symposium, Apr. 17-19, 2005, pp. 1-9, Oklahoma City, Oklahoma.

L. Quintero, et al., "One-Step Acid Removal of an Invert Emulsion," SPE 94604, SPE 6th European Formation Damage Conference, May 25-27, 2005, pp. 1-9, Scheveningen, The Netherlands. J.

J. L. Salager, "Emulsion Phase Inversion Phenomena" in Emulsions and Emulsion Stability, J. Sjoblöm Ed., 2nd Edition, Chap. 4, pp. 185-226, Taylor and Francis, London (2006).

(Continued)

*Primary Examiner* — Angela M DiTrani
(74) *Attorney, Agent, or Firm* — Mossman Kumar & Tyler PC

(57) ABSTRACT

Single-phase microemulsions (SPMEs) and in situ-formed microemulsions in water-wetting pills may be used to reverse the wettability of subterranean rock previously drilled with an oil-based mud or synthetic-based mud before pumping a high fluid loss squeeze pill or crosslink pill or other water-based pill. This wettability reversal occurs by solubilization of the non-polar material into the microemulsion when the water-wetting pill contacts the non-polar material. An in situ microemulsion may be formed when one or more surfactant and a polar phase (e.g. water or brine), and eventually some amount of organic phase, contacts the reservoir formation and reverses the wettability encountered in the porous media. The microemulsions are effective for reversing the wettability that occurs from non-polar materials which include, but are not necessarily limited to, oil-based mud, synthetic-based mud, paraffins, asphaltenes, emulsions, slugs, and combinations thereof.

19 Claims, 1 Drawing Sheet

OTHER PUBLICATIONS

J. L. Salager, et al., "Amphiphilic Mixtures versus Surfactant Structures with Smooth Polarity Transition across Interface to Improve Solubilization Performance", CESIO 2008—7th World Surfactant Congress Paris, Jun. 22-25, 2008, pp. 1-9.

J. Harrison; "Microemulsion Technology for Surfactants," Specialty Chemicals Magazine, Nov. 2004, pp. 32, 34,36.

PCT/US2008/068475; International Search Report and Written Opinion, Nov. 6, 2008. [corresponding PCT International application].

L. Quintero et al., "NAF Filter Cake Removal Using Microemulsion Technology," SPE-107499, European Formation Damage Conference, Scheveningen, The Netherlands, May 30-Jun. 1, 2007, pp. 1-6.

* cited by examiner

US 8,210,263 B2

METHOD FOR CHANGING THE WETTABILITY OF ROCK FORMATIONS

CROSS-REFERENCES TO RELATED APPLICATIONS

This application claims the benefit of U.S. Provisional Patent Application No. 61/076,022 filed Jun. 26, 2008, and is also a continuation-in-part of U.S. Patent Application Ser. No. 12/146,647 filed Jun. 26, 2008, which application in turn claims the benefit of U.S. Provisional Patent Application No. 60/947,870 filed Jul. 3, 2007, and which is additionally a continuation-in-part application of U.S. Ser. No. 11/866,486 filed Oct. 3, 2007.

TECHNICAL FIELD

The present invention relates to methods and compositions for changing the wettability of rock formations, and more particularly relates, in one non-limiting embodiment, to methods and compositions for changing the wettability of rock formations in subterranean reservoirs using aqueous micellar solution, miniemulsions, nanoemulsions, emulsions, or microemulsions fluids.

BACKGROUND

Wetting and wettability involve the contact between a liquid and a solid surface, resulting from the intermolecular interactions when the two are brought together. The amount of wetting depends on the energies (or surface tensions) of the interfaces involved such that the total energy is minimized. One measurement of the degree of wetting is the contact angle, the angle at which the liquid-vapor interface meets the solid-liquid interface. If the wetting is very favorable, the contact angle will be low, and the fluid will spread to cover or "wet" a larger area of the surface. If the wetting is unfavorable, the contact angle will be high, and the fluid will form a compact, self-contained droplet on the surface. If the contact angle of water on a surface is low, the surface may be said to be "water-wetted" or "water-wettable", whereas if the contact angle of an oil droplet on a surface is low, the surface may be said to be "oil-wetted" or "oil-wettable".

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds".

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are often suspended in oil, and water or brine is emulsified in the oil and therefore the oil is the continuous phase. Oil-based muds can be either all-oil based or water-in-oil macroemulsions, which are also called invert emulsions. In oil-based mud the oil can consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic hydrocarbons, alkyl benzenes, terpenes and other natural products and mixtures of these types.

When OBMs and/or SBMs (sometimes collectively referred to as non-aqueous fluids or NAFs) are used, the subterranean rock formations become oil wet and resistant to treatments using pills that are water-based. In the oilfield, a pill is any relatively small quantity (e.g. about 200 barrels or less (32 kiloliters)) of a special blend of a drilling fluid used to accomplish a particular task or job that a regular drilling fluid cannot perform. Non-limiting examples include high-viscosity pills to help lift cuttings out of a vertical wellbore; freshwater pills to dissolve encroaching salt formations; pills to free stuck pipe, such as to relieve differential sticking forces or to destroy filter cake; lost circulation or fluid loss pills to plug a thief zone or inhibit fluid from being lost into a relatively high permeability zone; and crosslink pills to deliver and crosslink polysaccharides such as guar gums to increase viscosity in a certain zone to prevent or inhibit fluid loss.

It would be desirable if compositions and methods could be devised to aid and improve the ability to switch or convert the wettability of a rock formation that is oil-wet into a water-wettable rock so that subsequently introduced water-based pills would perform and/or be more effective.

SUMMARY

There is provided, in one non-limiting form, a method of changing the wettability of a rock formation previously contacted with an oil-based mud (OBM). Generally, under such conditions the rock will have become oil-wet. The method involves pumping a water-wetting pill into the rock formation. The water-wetting pill may be one of several types. The pill may include a composition that is a conventional emulsion, a miniemulsion, a microemulsion or a single-phase microemulsion (SPME), which composition contains at least one surfactant, at least one non-polar fluid (this could be different from the non-polar fluid already that has already contacted the rock formation as part of the OBM), and at least one polar fluid. That is, these compositions, e.g. a microemulsion, are pre-formed. The second type of water-wetting pill may concern in situ emulsion-forming components that include at least one surfactant and at least one polar fluid. That is, the emulsion or microemulsion is formed in situ downhole. By the use of one or both of these pill types, the rock formation is thereby contacted with a composition and/or an emulsion as described above. In at least the case of the in situ emulsion-forming components, at least some of the first non-polar fluid is incorporated into the emulsion. By this method the wettability of at least part or all of the rock formation is changed to water-wet. Subsequently another pill, whose performance requires water-wet surfaces, such as a water-based treatment pill, is pumped into the rock formation and can be more effective. The water-wetting pill may optionally contain an acid, such as a mineral acid or organic acid.

The microemulsions of this method may involve thermodynamically stable, macroscopically homogeneous, single-phase microemulsions that include a polar phase, a non-polar phase (from the first and/or second non-polar fluid), a surfactant, and optionally and a co-surfactant.

DETAILED DESCRIPTION

Figure 1:
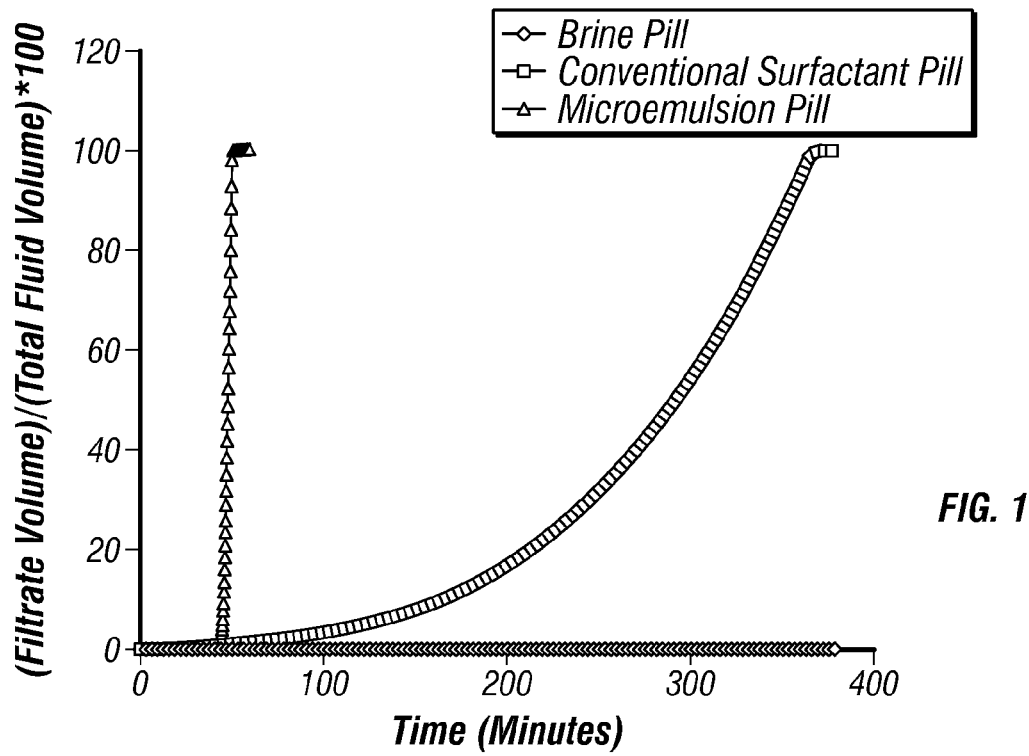
FIG. 1 is a graph of the ratio of filtrate volume as a ratio to total fluid volume as a function of time for a microemulsion pill at 100 psid (0.7 MPa) and 150° F. on a NAF filter cake.

It has been discovered that the oil wettability of rock formations can be reversed or changed by using a microemulsion or in situ-formed microemulsion water-wetting pill before pumping a water-based treatment pill, such as a high fluid loss squeeze pill or crosslink pill into wells previously drilled with synthetic or oil based muds (S/OBM). The majority of fluid loss squeeze pills and crosslink pills are formulated as water-based fluids. For this reason, it is necessary to remove the S/OBM and achieve a reversal of wettability in the formation, which may be naturally fractured or fracture induced, before pumping the fluid loss pills or other pills. Other types of pills besides fluid loss pills, with which the methods described herein would be effective include, but are not necessarily limited to, horizontal healer pills, reservoir rock cleaning pills and crosslink pills. The change in wettability from oil-wet to water-wet increases the filtration rate or leak off rate of the fluid loss pill into the fractures and fracture tip and forms a tight plug that packs and seals the fracture voids. This method increases the tight packing of the particles of the fluid loss pill (or lost circulation pill) in the permeable and fractured formation, and in consequence, improves the effectiveness of the pill.

The microemulsions may be single-phase microemulsions (SPMEs) formed prior to pumping to the subterranean reservoir, or the microemulsions may be formed in situ in the subterranean reservoir or an injected microemulsion could form a new microemulsion incorporating non-polar and polar fluids and optionally particles already present in the formation. This wettability changing method occurs by solubilization of a significant portion of the non-polar material and eventually polar material into the microemulsion when the water-wetting pill contacts the oil-wetted rock. An in situ microemulsion may be formed when one or more surfactant and a polar phase (e.g. usually, but not limited to, water) contacts the reservoir formation and solubilizes all or some of the non-polar fluid of the S/OBM or S/OBM filter cake encountered in the porous media (e.g. rock).

By "eventually" it is meant herein that the non-polar material and surfactant at some point later in time, such as downhole or separately added, contacts a polar fluid, such as reservoir fluids, or a fluid of intermediate polarity, such as a separately added alcohol or co-surfactant. By "eventually" it is meant that the contact is not necessary or compulsory, but that such eventual contact may not be ruled out. For instance, in order to make a microemulsion it is not always necessary to add an alcohol co-surfactant, but in some instances (e.g. ionic surfactants at low temperature) it is often necessary or at least it makes the process easier.

The in situ microemulsion removes (at least partially) the S/OBM, the S/OBM filter cake, promotes reversal of the wettability and at least partially removes the oil of the filter cake in oil and gas wells drilled with SBM or OBM. The benefit of using a microemulsion or in situ microemulsion before a high fluid loss squeeze pill (or other water-based pill treatment) is that the rock formation and solid particles of the filter cake turn from oil-wet to water-wet, which increases the strength of the pill at the interface with the rock formation. This phenomenon of increasing rock strength is particularly important in the near wellbore region.

In the methods and compositions herein, changing the wettability of the rock formation may be accomplished by contacting the S/OBM and other non-polar materials with an in situ-formed fluid or a pre-formed microemulsion (Winsor III) and/or single-phase microemulsion, such as Winsor IV or similar chemistry, as will be described later in more detail. The in situ formed emulsion fluid refers to any emulsion or similar type of composition formed downhole in situ, and may include, but not necessarily be limited to, conventional emulsions (sometimes called macroemulsions), miniemulsions, all types of microemulsions, nanoemulsions and mixtures thereof. Single-phase microemulsions can be defined as bi-continuous phases formed by oil, water, surfactant and optionally a co-surfactant. In one non-limiting explanation of the phenomenon, a single-phase microemulsion contacts the oil-based mud and other non-polar materials and still has the characteristic properties of a microemulsion. It has been surprisingly discovered that this contacting may be accomplished without circulating the well, by which is meant pumping fluid through the whole active fluid system, including the borehole and all the surface tanks that constitute a primary system. That is, the fluid with the pre-formed SPME is pumped as a pill into the formation or subterranean reservoir and allowed to contact the rock formation and soak the oil and non-polar materials present, with the wettability reversal action taking place by diffusion or by flow energy. In other non-limiting embodiments, it may be helpful to circulate the fluid to remove surface damage before pumping a pre-formed SPME pill into the formation or subterranean reservoir. Performing this step will ensure that the activity or oil solubilization capacity of the water-wetting pill is not compromised before entering a fracture or loss zone.

It has also been discovered that the microemulsion may be formed in situ downhole. That is, it is not necessary to form the microemulsion on the surface and pump it downhole. As noted, the literature generally describes these microemulsions as single-phase microemulsions, referred to as Winsor IV case of phase behavior, but the present method includes also the use of three-phase systems in which the microemulsion is in equilibrium with an excess of both the polar phase (brine) and non-polar phase (oil), which is usually referred to as the Winsor III case of phase behavior.

More specifically, the methods and compositions herein involve using an in situ-formed fluid such as a microemulsion for removing oil-based mud (OBM) or synthetic oil-based mud (SBM), and reversing the wettability of the rock formations in the subterranean reservoirs of oil or gas wells drilled with SBMs or OBMs prior to the use of a water-based fluid loss pill. The in situ fluid (e.g. microemulsion, nanoemulsion, etc.) may be formed when at least one surfactant and a polar phase (usually, but not limited to water or brine) contacts the OBM or other non-polar materials and solubilizes the non-polar material of the OBM. It should be understood herein that the term OBM encompasses SBMs.

One of the benefits of the in situ fluid formation of the microemulsion is that the water-wetting pill does not require any oil or solvent in its initial formulation, or at least much less than the proportion that could be solubilized in the final microemulsion, which gives a higher capacity for oil or non-polar material incorporation or cleaning capability when contacted with the OBM and other non-polar materials on the rock formation. Another benefit is that any particles or other oil-wet contamination turn from oil-wet to water-wet. Additionally, water-wetting improves damage remediation (including, but not limited to, filter cake destruction) when mineral acids, organic acids, oxidizing agents, water-soluble enzymes (e.g. catalysts), or precursors of these components (e.g. in situ acid generators) are spotted into a subterranean reservoir after the wettability reversal process, because it favors the contact between the acid and the particles. In one non-restrictive version, it may be desirable to use acid or other damage removal additives but only after a wettability change and more likely, some time after the drilling phase. As the OBM (or SBM) is contacted by the water-wetting pill and absorbed and/or the oil-wet, non-polar materials and rock surfaces are converted from oil-wet to water-wet during the in situ formation of a fluid, such as a microemulsion or nanoemulsion or precursors of them, the blend of surfactants and a polar phase (e.g. water) may also contain acids, barite dissolvers (chelants) or other precursor additives that can dissolve the acid-soluble particles or dissolve the barite and other particulates and also break down any polymeric fluid loss additive (if present). In many cases, the surfactant may be a surfactant blend and is often a surfactant and co-surfactant mixture, in which the co-surfactant is a short amphiphilic substance such as an alcohol (in non-limiting examples, propanol, butanol, pentanol in their different isomerization structures) as well as glycols, and ethoxylated and propoxylated alcohols or phenols. Alcohols are also noted herein as substances of intermediate polarity; that is, intermediate between non-polar substances such as oils and polar substances such as water.

In one non-limiting embodiment, the in situ-formed emulsion may be made using a surfactant, a polar fluid and a relatively small amount of non-polar fluid and/or fluid of intermediate polarity. It has been found that it is sometimes helpful when forming an in situ emulsion downhole to inject a water solution of surfactant already containing some solubilized oil (in a non-restrictive example only from about 2 to about 5% or so). In other words, the injected fluid may be considered as a single-phase microemulsion containing only 2% of oil, and then once in the reservoir this fluid will solubilize the oil which is in situ on the rock formation and thus becomes another single-phase microemulsion containing much more oil, in a non-limiting instance, about 30 or 40%.

The net effect of such a treatment system will improve an operator's ability to pump water-based treatment pills into a reservoir for instance to improve fluid loss control, and thereby improve production rates in producing wells or reduce the costly loss of S/OBM drilling fluid in the fractured zone whether it be in the reservoir or above the reservoir. In either case, non-polar material alteration is accomplished by creating the in situ-formed fluid (e.g. single-phase microemulsion) across the injection/production interval or pumping the pre-formed SPME into the formation.

It will be appreciated that it is not necessary for all of the oil-wet rock or filter cake to have its wettability reversed for the inventive method and its compositions to be considered successful. Success is obtained if more of the oil-wetted rock formation is reversed and becomes water-wetted using the microemulsions herein, whether not formed in situ (e.g. single-phase microemulsion) than if it is not used, or if more rock surface becomes relatively more water-wet using the microemulsions together with a chelating agent, as compared to the case where no microemulsions or other similar compositions are used. Alternatively, the methods and compositions are considered successful if at least a portion of the rock formation becomes water wet. In one non-limiting embodiment at least a majority (>50%) of the rock becomes water-wet. In general, of course, it is desirable to convert as much of the rock formation from oil-wet to water-wet as possible. One non-restrictive goal of the methods and compositions herein is to reverse the wettability of the rock to obtain a higher percentage of effectiveness of the subsequently introduced treatment pills.

The subterranean reservoir wettability reversal technology described herein has a wide range of applications. By combining the chemical aspect of wellbore wetting reversibility and/or clean up with displacement techniques, it is believed that subterranean reservoir disadvantages after drill-in with OBMs (e.g. invert emulsion fluids) may be significantly reduced or eliminated.

The methods and compositions herein may be used to reverse the wettability of subterranean rock, and may also remove, heal, and/or remediate damage caused by deposits of macromolecules from crude oils, such as the case of deposition of asphaltenes in the reservoir porous media. Other damage that may be removed includes any emulsions that incorporate or include any non-polar material (oil and other hydrocarbons) from the reservoir, or introduced in the drilling mud, as well as other substances injected downhole.

Thus, the methods and compositions herein have the advantages of being able to reverse the wettability of subterranean rock prior to the pumping of a pill such as a fluid loss pill, to increase and improve the adherence of the fluid loss pill or other pill to the formation, and as a consequence, improve the effectiveness of the pill, such as to control, prevent or inhibit lost circulation. The water-wetting pill may also reduce formation damage, and consequently increase hydrocarbon recovery, and/or increase water injection rate, as compared with an otherwise identical method and composition without microemulsions (in situ or otherwise), e.g. single-phase microemulsions and/or the single-phase microemulsion including an acid or other component. Microemulsions are thermodynamically stable, macroscopically homogeneous mixtures of at least three components: a polar phase and a nonpolar phase (usually, but not limited to, water and organic phase) and at least one surfactant, often more than one surfactant, for instance with a co-surfactant such as an alcohol, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Suitable co-surfactants include, but are not necessarily limited to, mono or poly-alcohols, low molecular weight organic acids or amines, polyethylene glycol, low ethoxylation solvents such as butoxyethanol and the like, and mixtures thereof. Microemulsions form spontaneously and differ markedly from the thermodynamically unstable macroemulsions, which depend upon intense mixing energy for their formation.

Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase behavior defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions herein are of the Winsor IV type, which means the entire system is a microemulsion phase at least at first and somewhere in the process, with the possibility of ending with one or two excess phases as the injected formulation is diluted by the reservoir fluids. The thermodynamically stable single-phase Winsor IV microemulsion could evolve by a change in formulation or composition into the formation of a miniemulsion or nanoemulsion, which is a two-phase system either Winsor I or Winsor II with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjoblöm Ed., $2^{nd}$ Edition, Chap. 4, pp. 185-226, Taylor and Francis, London (2006).

Surfactants suitable for creating the in situ fluids (e.g. single-phase microemulsions) herein include, but are not necessarily limited to, non-ionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, or alcohol ethoxylates and mixtures thereof. In one non-restrictive version, polyglycol esters are particularly suitable including, but not necessarily limited to, those described in U.S. Pat. No. 7,238,647. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, and mixtures thereof. Suitable cationic surfactants include, but are not necessarily limited to, arginine methyl esters, alkanolamines and alkylenediamides. In one non-limiting embodiment at least two surfactants in a blend may be used to create single-phase microemulsions in situ, as well as the other in-situ fluids.

Suitable surfactants may also include fluorocarbon surfactants, silicon surfactants, cleavable, gemini surfactants and so-called extended chain surfactants containing a non-ionic spacer-arm central extension and an ionic or nonionic polar group. "Cleavable surfactants" are a special class of surfactants with controlled half-lives that are rendered inactive by cleavage of some of their tailor-made weak chemical bonds, which break down either under acidic hydrolysis, alkaline hydrolysis or under the presence of ultraviolet light, in order to make the material compatible with a subsequent procedure, or in order to selectively remove the cleavage products, or in order to have the cleavage product impart a new function. Extended chain surfactant have a lipophilic spacer arm and a hydrophilic polar head. The non-ionic spacer-arm central extension may be the result of polypropoxylation, polyethoxylation, or a mixture of the two, in non-limiting embodiments. Alternatively, the extended chain surfactant may have a propoxylated spacer arm having from 2 to 20 propoxy moieties and an ethoxylated spacer arm having from 0 to 20 ethoxy moieties. The extended chain surfactant may have a lipophilic moiety including, but not necessarily limited to, linear or branched, saturated or unsaturated hydrocarbon chains having from 8 to 50 carbon atoms. Further, the extended chain surfactant has a hydrophilic polar head that may include, but not necessarily be limited to, polyoxyethylene, sulfate, ethoxysulfate, carboxylate, ethoxy-carboxylate, C6 sugar, xylitol, di-xylitol, ethoxy-xylitol, carboxylate and xytol, carboxylate and glucose. Further details about suitable extended chain surfactants may be found in U.S. Patent Application Publication No. 2009-0183877 A1, incorporated herein in its entirety by reference.

In another non-restrictive embodiment, the SPME and in situ fluid formulation (e.g. macroemulsion, nanoemulsion, etc.) may contain a co-surfactant which may be an alcohol having from about 3 to about 10 carbon atoms, in another non-limiting embodiment from about 4 to about 6 carbon atoms. A specific example of a suitable co-surfactant includes, but is not necessarily limited to butanol. These co-surfactants may be alkoxylated, e.g. ethoxylated and/or propoxylated, although in most cases sufficient ethoxylation should be present to accomplish the purposes of the methods described herein. In one non-restrictive embodiment the number of ethoxy units ranges from about 3 to about 15, alternatively from about 6, independently up to about 10.

In one non-restrictive version, an optional co-surfactant may be employed. The proportion of co-surfactant to be used with the surfactant is difficult to specify in advance and may be influenced by a number of interrelated factors including, but not necessarily limited to, the nature of the surfactant, the nature of the co-surfactant, the type of drilling fluid being removed, displaced or otherwise contacted or affected, wellbore conditions, and the like. In one non-limiting embodiment, a fluid to be pumped includes a surfactant blend of polyethoxylated alkyl sulfate and polyglycerol ester (such as PG 8-10 ester available from Oleon N.V.) that has a molar ratio of free OH/esterified OH of 3.4/1, optionally with an alkyl alcohol ethoxylated with 7.5 or higher EO.

In one non-limiting embodiment herein, the SPME or in situ-formed emulsion contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as ESCAID 110 (from EXXON) or ECD 99-DW oils (from TOTAL) can also be used as a non-polar liquid in preparing the fluid systems of herein. Other suitable non-polar liquids include, but are not necessarily limited to, limonene, pinene and other terpenes, xylene, mutual solvents, and the like. As noted previously, an advantage of forming the active formula (e.g. nanoemulsion, single-phase microemulsion, etc.) in situ is that less non-polar liquid needs to be used (as compared with a pre-formed microemulsion) since all or most of the non-polar liquid is found in the non-polar materials, OBM (or SBM) itself. This gives a higher capacity for the microemulsion, e.g., to reverse the wettability of the rock and solubilize the oil and other substances of the non-polar materials present.

It will be appreciated that the amount of in situ fluid to be created or formed and the amounts of in situ-forming components (polar fluid, nonpolar fluid and a surfactant and co-surfactant, if present) to be added or included are difficult to determine and predict in advance with much accuracy since it is dependent upon a number of interrelated factors including, but not necessarily limited to, the brine type, the OBM or SBM type, the temperature of the formation, the particular surfactant or surfactant blend used, etc. Nevertheless, in order to give some idea of the quantities used, in one non-limiting embodiment, the proportion of non-brine components in the in situ fluid (e.g. single-phase microemulsion) may range from about 15 to about 85 volume %, even about 90 volume %, and in other non-limiting embodiments may range from about 1 to about 20 volume % in a diluted microemulsion, sometimes called micellar solutions, and from about 70 to about 95 volume % in another diluted microemulsion, sometimes called an inverse micellar solution.

It is expected that brine will be a common component of the in situ fluid (e.g. single-phase microemulsion), and any of the commonly used brines, and salts to make them, are expected to be suitable in the compositions and methods herein. Although water is expected to be the polar liquid used to make the microemulsions in situ, it will be appreciated that other polar liquids such as alcohols and glycols, alone or together with water, may be used.

With further specificity, the methods and compositions herein may concern one-trip water-wetting pills designed to physically change an OBM (e.g. an invert emulsion) and other non-polar materials so that the rock becomes water-wet or largely water-wet. The inventive method not only physically changes the nature of the rock surface and any non-polar materials present, the resulting oil components which are incorporated into the single-phase microemulsion (e.g.) formation in situ and then further micro-emulsified or solubilized, allow for more effective introduction of subsequent water-based pills. With the conversion of the external oil to internal emulsified oil in water, most of the non-polar fluid and particulate material is either removed or micro-sized to the extent that only a minimal or reduced amount of non-polar components remain in the subterranean formation being treated.

In one non-limiting embodiment and in still further detail, the compositions and methods herein utilizes a microemulsion or other in situ fluid to convert an OBM and oil-wet particles to a water-based fluid and water-wet particles. The benefits of such conversions, often called inversion, are several. Non-polar materials are oil wet and pose compatibility problems for certain completion operations, such as water injection and gravel packing, whereas water-based or water-wet components are naturally compatible with most fluid loss pills, injection water and brine-based gravel pack carrier fluids. Additionally, WBMs and water-wet particles are ideal for damage remediation of the subterranean reservoir when mineral acids, organic acids, oxidizing agents, water soluble enzymes (catalysts) and in situ acid generators are spotted in a wellbore after (or during) the treatment.

In another non-limiting embodiment, the salts suitable for use in creating the brine include, but are not necessarily limited to, ammonium chloride, sodium chloride, potassium chloride, calcium chloride, sodium bromide, zinc bromide, calcium bromide, sodium formate, potassium formate, cesium formate, magnesium chloride or acetate and combinations thereof. The density of the brines may range from about 8.4 lb/gal to about 17 lb/gal (about 1 to about 2.04 kg/liter), although other densities may be given elsewhere herein.

The in situ fluid (e.g. single-phase microemulsion) treatment may be composed of different brine and oil blends, depending on the required density of the fluid for the well.

This technology does not require or discriminate against any invert emulsion. In other words, the single-phase microemulsion may be applied to reverse the wettability of the reservoir previously contacted with any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In one non-limiting embodiment the methods and compositions are practiced in the absence of amine emulsifiers, such as rosin amines and/or amine emulsifiers of the formula $R-N-[(CH_2CH_2R'A)_xH]_2$, such as those defined in U.S. Pat. No. 6,989,354. In another non-limiting embodiment the methods and compositions described herein are practiced and used in the absence of a propionate, particularly used as a co-surfactant and/or co-solvent as described in WO 2006/109016 A1.

Another important feature relative to other OBM, invert emulsion or other non-polar material removal methods is that the oil phase of the OBM emulsion is micro-emulsified into the single-phase microemulsion (or in other in situ fluid, such as nanoemulsion, miniemulsion or single-phase emulsion) by soaking, that is simple contacting, letting the diffusion produce the mixing over a time span ranging from a few minutes to a few days. The inventive treatment process reduces the energy necessary for the microemulsion to form when compared to previous methods. This efficiency eliminates or reduces the number of pipe trips and decreases the time required to complete the well.

The invention will now be discussed with reference to the following Example which is not intended to limit the invention in any way, but instead is provided to illustrate one non-limiting embodiment thereof.

EXAMPLE 1

The following procedure was used for Example 1.
1. A filter cake was built for 3 hours with a 500 psi (3.4 MPa) overbalance at 150° F. (66° C.) on a 35 µm ceramic filter disk.
2. After building the OBM filter cake, the microemulsion pill treatment was applied with 100 psi (0.7 MPa) overbalance at 150° F. (66° C.) with the outlet valve open to allow the pill treatment to pass through the OBM filter cake at the temperature of interest until all or most of the treatment filtrate had been collected or a maximum 3 hours is reached (FIG. 1). A filtrate collected in less than 3 hours is considered a good treatment pill
3. After the microemulsion filtrate was collected, the LCM pill was added in the top of the treated filter cake and the cell was pressurized to 1,000 psi (6.9 MPa). The outlet valve was opened and filtrate from the LCM pill was collected for 30 minutes (FIG. 2).

Figure 2:
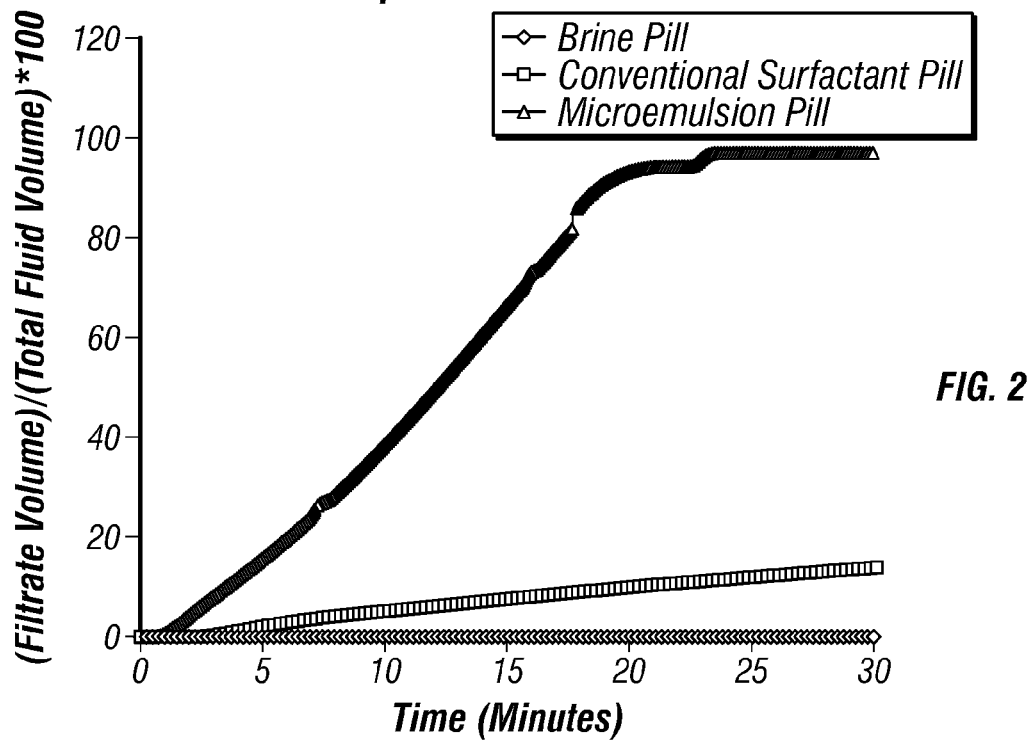
FIG. 2 is a graph of the ratio of filtrate volume as a ratio to total fluid volume as a function of time for a lost circulation material (LCM) pill after being applied to a NAF filter cake treated with a microemulsion pill.

FIGS. 1 and 2 show the results of the tests with (1) a microemulsion pill, (2) a conventional surfactant pill treatment and (3) a brine pill (baseline). As can be seen in FIG. 2, the microemulsion treatment pill significantly improved the fluid loss of the LCM.

A dispersion test of solids in water using the residual OBM filter cake after the treatment with the microemulsion indicates that the method described herein effectively reversed the wettabilty of the filter cake from oil-wet to water-wet which promoted high fluid loss. In the case of the treatments with conventional surfactant pill and brine pill treatments, the residual OBM filter cake was oil-wet and the filtrate volumes were very low.

In the foregoing specification, the invention has been described with reference to specific embodiments thereof, and has been suggested as effective in providing effective methods and compositions for reversing the wettability of subterranean reservoirs and rock formations. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of single-phase microemulsion-forming components and other components for forming the in situ fluids, such as surfactants, co-surfactants, acids, solvents, non-polar liquids, etc. and proportions thereof falling within the claimed parameters, but not specifically identified or tried in a particular composition to reverse the wettability of rock formations herein, are anticipated to be within the scope of this invention. For instance, in one non-limiting embodiment, in the case of oil reservoirs that are naturally oil-wet, it may be advantageous to use the method herein to change the wettability of rock formations in the other direction, that is to change the wettability of a rock formation previously contacted with a water-based mud (WBM) using an oil-wetting pill.

As used herein, and in the claims, the words "comprising" and "comprises" is to be interpreted to mean "including but not limited to".

The present invention may suitably comprise, consist or consist essentially of the elements disclosed and may be practiced in the absence of an element not disclosed.

What is claimed is:

1. A method of changing the wettability of a rock formation previously contacted with an oil-based mud (OBM) comprising a non-polar fluid, the method comprising:
   pumping a water-wetting pill into the rock formation, where the water-wetting pill comprises
      in situ emulsion-forming components comprising:
         at least one surfactant; and
         at least one polar fluid;
      thereby contacting the rock formation with the water-wetting pill;
   forming in situ an in situ-formed emulsion from the in situ emulsion-forming components and at least some of the non-polar fluid of the OBM where the in situ-formed emulsion is a thermodynamically stable, macroscopically homogeneous mixture of at least three components, where the three components comprise a polar phase from the polar fluid, a non-polar phase at least partially from the non-polar fluid of the OBM, and the at least one surfactant, where the water-wetting pill further comprises an acid selected from the group consisting of mineral acids, acetic acid, formic acid, polyamino carboxylic acids, salts of these acids and mixtures thereof;
   changing the wettability of at least part of the rock formation to water-wet; and
   subsequently pumping a second pill into the rock formation where the subsequent pill comprises water.

2. The method of claim 1 where the second pill is selected from the group consisting of fluid loss pills, crosslink pills, reservoir rock cleaning pills, horizontal healing pills and combinations thereof.

3. The method of claim 1 where the at least one surfactant is selected from the group consisting of non-ionic surfactants, anionic surfactants, cationic surfactants, amphoteric surfactants, flurocarbon surfactants, silicon surfactants, cleavable, gemini surfactants, and extended surfactants containing a non-ionic spacer-arm central extension and an ionic or non-ionic polar group, and mixtures thereof.

4. The method of claim 3 where in the surfactants:
   the nonionic surfactants are selected from the group consisting of alkyl polyglycosides, sorbitan esters, methyl glucoside esters, polyglycol esters, and alcohol ethoxylates;
   the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;
   the cationic surfactants are selected from the group consisting of arginine methyl esters, alkanolamines, and alkylenediamides; and
   the extended chain surfactants comprise propoxylated spacer arms, ethoxylated spacer arms, propoxylated and ethoxylated spacer arms, and mixtures thereof.

5. The method of claim 1 where at least one polar fluid further comprises brine.

6. The method of claim 1 where the in situ emulsion-forming components further comprise a fluid selected from the group consisting of a non-polar fluid, a fluid of intermediate polarity and mixtures thereof.

7. The method of claim 1 where the surfactant in the water-wetting pill is an ionic surfactant and the water-wetting pill further comprises a co-surfactant.

8. The method of claim 7 where the co-surfactant is a surface active substance selected from the group consisting of mono or poly-alcohols, organic acids or amines, polyethylene glycol, ethoxylation solvents and mixtures thereof.

9. A method of changing the wettability of a rock formation previously contacted with an oil-based mud (OBM) comprising a non-polar fluid, the method comprising:
   pumping a water-wetting pill into the rock formation, where the water-wetting pill comprises
      in situ emulsion-forming components comprising:
         at least one surfactant; and
         at least one polar brine fluid;
      thereby contacting the rock formation with the water-wetting pill;
   forming in situ an in situ-formed emulsion from the in situ-emulsion-forming components and at least some of the non-polar fluid of the OBM where the in situ-formed emulsion is a thermodynamically stable, macroscopically homogeneous mixture of at least three components, where the three components comprise a polar phase from the polar brine fluid, a non-polar phase at least partially from the non-polar fluid of the OBM, and the at least one surfactant, where the water-wetting pill further comprises an acid selected from the group consisting of mineral acids, acetic acid, formic acid, polyamino carboxylic acids, salts of these acids and mixtures thereof;
   changing the wettability of at least part of the rock formation to water-wet; and
   subsequently pumping a second pill into the rock formation where the subsequent pill comprises water.

10. The method of claim 9 where the second pill is selected from the group consisting of fluid loss pills, crosslink pills, horizontal healer pills, reservoir rock cleaning pills and combinations thereof.

11. The method of claim 9 where the at least one surfactant is selected from the group consisting of non-ionic surfactants, anionic surfactants, cationic surfactants, amphoteric surfactants, flurocarbon surfactants, silicon surfactants, cleavable, gemini surfactants, and extended surfactants containing a non-ionic spacer-arm central extension and an ionic or non-ionic polar group, and mixtures thereof.

12. The method of claim 11 where in the surfactants:
   the nonionic surfactants are selected from the group consisting of alkyl polyglycosides, sorbitan esters, methyl glucoside esters, polyglycol esters, and alcohol ethoxylates;
   the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;

the cationic surfactants are selected from the group consisting of arginine methyl esters, alkanolamines, and alkylenediamides; and the extended chain surfactants comprise propoxylated spacer arms, ethoxylated spacer arms, propoxylated and ethoxylated spacer arms, and mixtures thereof.

13. The method of claim 9 where the in situ emulsion-forming components further comprise a fluid selected from the group consisting of a non-polar fluid, a fluid of intermediate polarity and mixtures thereof.

14. The method of claim 9 where the surfactant in the water-wetting pill is an ionic surfactant and the water-wetting pill further comprises a co-surfactant.

15. The method of claim 14 where the co-surfactant is a surface active substance selected from the group consisting of mono or poly-alcohols, organic acids or amines, polyethylene glycol, ethoxylation solvents and mixtures thereof.

16. A method of changing the wettability of a rock formation previously contacted with an oil-based mud (OBM) comprising a non-polar fluid, the method comprising:

pumping a water-wetting pill into the rock formation, where the water-wetting pill comprises
in situ emulsion-forming components comprising:
at least one surfactant; and
at least one polar fluid;
thereby contacting the rock formation with the water-wetting pill;

forming in situ an in situ-formed emulsion from the in situ emulsion-forming components and at least some of the non-polar fluid of the OBM where the in situ-formed emulsion is a thermodynamically stable, macroscopically homogeneous mixture of at least three components, where the three components comprise a polar phase from the polar fluid, a non-polar phase at least partially from the non-polar fluid of the OBM, and the at least one surfactant, where the water-wetting pill further comprises an acid selected from the group consisting of mineral acids, acetic acid, formic acid, polyamino carboxylic acids, salts of these acids and mixtures thereof;

changing the wettability of at least part of the rock formation to water-wet; and subsequently pumping a second pill into the rock formation where the subsequent pill comprises water, the second pill being selected from the group consisting of fluid loss pills, crosslink pills, reservoir rock cleaning pills, horizontal healing pills and combinations thereof;

where the at least one surfactant is selected from the group consisting of non-ionic surfactants, anionic surfactants, cationic surfactants, amphoteric surfactants, flurocarbon surfactants, silicon surfactants, cleavable, gemini surfactants, and extended surfactants containing a non-ionic spacer-arm central extension and an ionic or nonionic polar group, and mixtures thereof.

17. The method of claim 16 where in the surfactants:

the nonionic surfactants are selected from the group consisting of alkyl polyglycosides, sorbitan esters, methyl glucoside esters, polyglycol esters, and alcohol ethoxylates;

the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;

the cationic surfactants are selected from the group consisting of arginine methyl esters, alkanolamines, and alkylenediamides; and the extended chain surfactants comprise propoxylated spacer arms, ethoxylated spacer arms, propoxylated and ethoxylated spacer arms, and mixtures thereof.

18. The method of claim 16 where the in situ emulsion-forming components further comprise a fluid selected from the group consisting of a non-polar fluid, a fluid of intermediate polarity and mixtures thereof.

19. The method of claim 16 where the surfactant in the water-wetting pill is an ionic surfactant and the water-wetting pill further comprises a co-surfactant.

* * * * *